Patented Oct. 18, 1932

1,883,652

UNITED STATES PATENT OFFICE

ALBERT K. EPSTEIN, OF CHICAGO, ILLINOIS

PROCESS OF PRODUCING EGG PRODUCT

No Drawing.  Application filed April 10, 1930. Serial No. 443,255.

My invention relates to an improved egg product and process for producing the same.

It has for its object provision of an egg product having characteristics making it desirable for certain specific uses.

Another object is the provision of an egg product particularly adapted for use in the manufacture of mayonnaise.

Generally speaking my invention is directed to the production of an egg product in which the yolk is treated so as to modify its physical consistency during refrigeration in such a way that the product either before or after warming, following such refrigeration, will have very desirable emulsifying properties. As I will point out more specifically hereinafter I employ sugar, salt, or other substances having similar actions for modifying the physical consistency of the product, and an edible acid, such as acetic or other acids of an equivalent character, and the composition so produced is refrigerated below the temperature of normal untreated egg yolks, but above the freezing temperature of the mixture. The resulting product has an unusually smooth consistency with a viscosity lending itself to the production of a superior mayonnaise. One of its particular advantages is that when delivered to a mayonnaise establishment for use in the production of mayonnaise, it may immediately be incorporated in the product without preliminary warming. It is the present practice to pack egg materials in approximately thirty pound containers, and the advantage from a manufacturing point of view of being able to use the contents of such containers without preliminary warming is readily seen. Not only is the advantage an economical one, but the product produced is a very stable emulsion and possesses unusual characteristics in other respects. I wish to state however, that this viscosity is maintained over a wide range of temperatures; and even when employed at room temperature, the egg product produced by my invention has very advantageous emulsifying properties.

In carrying out the invention I take commercial egg yolk, preferably a so-called dry yolk, having little adhering whites, or egg yolk and a suitable edible acid such as acetic acid or the like, capable of reducing bacteria and other micro-organisms therein to an extent to reduce putrefaction and retard other bacterial decomposition in the liquid state, and capable of acting on the constituent of the egg material during refrigerations, and treat this material further with sucrose or any other suitable substantially neutral, water soluble, edible, organic compound containing at least one hydroxyl group, capable of lowering the freezing point of water, and a suitable substantially neutral edible salt system such as common table salt or its equivalent so as to substantially modify the final normal viscosity and mobility of the product. I then take this mixture which has a lower freezing point than that of ordinary untreated egg yolks, and refrigerate it at a temperature below the freezing temperature of untreated yolks, but above the freezing temperature of the mixture. Or, in another way of carrying out the invention I may take yolk material and a substantial amount of sucrose or its equivalent, as referred to above; or yolk, sugar and acid, and treat either combination further with a substantial quantity of a suitable substantially neutral edible salt system such as common table salt, and treat either one of these materials by refrigeration as described above.

Now I am aware that sugar, salt, and acid, and combinations thereof have been employed in the treatment of egg yolks and I have no intention of covering by my present application any of the old practices in the art. Heretofore in the use of these substances, egg yolks in various combinations have been subjected to a freezing process, whereas in my present invention I avoid freezing, but reduce the temperature materially so as substantially to reduce enzyme action, but not low enough to freeze the product. I have found that when a product containing these materials is frozen, the colloidal substances concentrate during the freezing period as the freezing process progresses. As more and more ice crystals are formed, the dissolved sugar and salt, or sugar, salt, and acid, or whatever combination is used, become more and more concentrated, thus having certain effects upon the properties of the egg material which are incapable of accurate control. Now I am aware that a frozen product has advantageous uses for certain purposes, particularly when used in certain ways. But my present process has certain disadvantages over and above those resulting from the use of the freezing process, particularly for certain specific purposes.

Now with reference to the acid ingredients, I preferably employ any edible acid capable of reducing bacteria when used in proper proportions. To this end I find that I can obtain good results with either citric, phosphoric, tartaric, lactic, malic, or succinic acids. In the salt system I preferably use common table salt or sodium chloride, although I may use an alkaline sodium phosphate treated with sufficient acid sodium phosphate to give a substantially neutral mixture; or tri-sodium citrate treated with sufficient citric acid or some other edible acid to render the sodium citrate fully neutral, or with an acid salt.

In conjunction with the salt I may add to the yolk substance, an appreciable amount of a water soluble organic compound containing one or more hydroxyl groups, such as glycerine, cane sugar, or its equivalent. All of these substances in various and specific combinations, as will be hereinafter pointed out, may be used with good results. In general, it is desirable to use quantities of modifying agents which will substantially lower the freezing point of the egg material.

As a specific example of my invention I may employ salt and sugar together, 5% of each, incorporate them with yolk substance consisting essentially of egg yolk, and refrigerate the resulting mixture at a temperature below the freezing temperature of untreated yolks, but above the freezing temperature of the mixture. Or, I may employ 8 to 10% of either salt or sugar, with approximately ½ to 1% of an edible acid such as lactic acid. I may use acid in much smaller proportions, such as $\frac{1}{10}$th to $\frac{2}{10}$th, in combination with 10% of sugar material or in combination with 10% of sodium chloride, added to egg yolk consisting of substantially yolk material and subject the mixture to a temperature below 32 degrees Fahr. such, as for example, 30 degrees Fahr. or any other desired low temperature, which is above the freezing point of the mixture, and keep same at these temperatures for any desired length of time until ready for use. If a monosacharide such as dextrose is used, the temperature can be lowered much more without freezing than when a disacharide such as sucrose or maltose is used in a given combination. In the case of 10% sodium chloride and acid in combination with a yolk material consisting essentially of egg yolk, the product may be kept at still lower temperatures such as 12 degrees Fahr. for a number of months without freezing.

At such low temperatures there is an arrest of enzymic action, and at the same time the acid and the salt jointly affect the colloidal properties of the egg material during the several months of refrigeration period. I may employ a combination of cane sugar, malt sugar or dextrose together with sodium chloride to the extent of about 10% of total modifying agents, added to a yolk material of a high solid content, and keep the mixture above the freezing point of a given combination, and below the freezing point of the yolk material itself for any desired time until ready for use.

I do not limit myself, however, to the amount of salt and sugar added to the egg material as long as sufficient quantity is used so that the product will keep in good condition at the temperatures described. At the same time, however, the amount of these substances should be sufficient to modify the physical consistency of the product so as to obtain a smooth, homogeneous final product with improved colloidal properties.

What I claim is new and desire to protect by Letters Patent of the United States is:—

1. The method of manufacturing an egg product adapted for use as an emulsifying agent in the making of mayonnaise, which includes treating yolk material consisting essentially of egg yolk with a substantial quantity of an edible water soluble organic material containing at least one hydroxyl group and capable of lowering the freezing point of water, and a substantial quantity of an edible neutral salt system insufficient to saturate the moisture content of the yolk, and then subjecting the resulting mixture to a temperature below the freezing temperature of untreated yolks, but above the freezing temperature of the mixture, and maintaining the mixture at such temperature until desired for use.

2. The method of manufacturing an egg product adapted for use as an emulsifying agent in the making of mayonnaise, which includes treating yolk material consisting essentially of egg yolk with a substantial quantity of an edible water soluble organic material containing at least one hydroxyl group, a substantial quantity of an edible neutral salt system insufficient to saturate the moisture content of the yolk, and an edible acid, and then subjecting the resulting mixture to a temperature below the freezing temperature of untreated yolks, but above the freezing temperature of the mixture, the mixture being kept at such temperature until ready for use.

3. The method of manufacturing an egg product adapted for use as an emulsifying agent in the making of mayonnaise, which includes treating yolk material consisting essentially of egg yolk with a substantial quantity of an edible water soluble organic material containing at least one hydroxyl group, and an edible acid, and then subjecting the resulting mixture to a temperature below the freezing temperature of untreated yolks, but above the freezing temperature of the mixture, the mixture being kept at such temperature until ready for use.

4. The method of manufacturing an egg product adapted for use as an emulsifying agent, which comprises adding to yolk material a substantial amount of salt insufficient to saturate the moisture content of the yolk and sugar and a relatively small amount of an edible acid, and then treating the resulting mixture by refrigeration above the freezing temperature of the mixture, but below the freezing temperature of untreated egg yolks during a sufficiently long period to modify the viscosity characteristics thereof.

In witness whereof, I hereunto subscribe my name this 21st day of March, 1930.

ALBERT K. EPSTEIN.